United States Patent
McKenney

(10) Patent No.: US 9,244,844 B2
(45) Date of Patent: *Jan. 26, 2016

(54) ENABLING HARDWARE TRANSACTIONAL MEMORY TO WORK MORE EFFICIENTLY WITH READERS THAT CAN TOLERATE STALE DATA

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 240 days.

This patent is subject to a terminal disclaimer.

(21) Appl. No.: 13/827,970

(22) Filed: Mar. 14, 2013

(65) Prior Publication Data

US 2014/0281267 A1    Sep. 18, 2014

(51) Int. Cl.
*G06F 12/08* (2006.01)
*G06F 9/46* (2006.01)

(52) U.S. Cl.
CPC ............ *G06F 12/0828* (2013.01); *G06F 9/467* (2013.01); *G06F 12/0815* (2013.01)

(58) Field of Classification Search
USPC ........................................................ 711/141
See application file for complete search history.

(56) References Cited

U.S. PATENT DOCUMENTS

| 5,442,758 | A | 8/1995 | Slingwine et al. |
| 5,608,893 | A | 3/1997 | Slingwine et al. |
| 5,727,209 | A | 3/1998 | Slingwine et al. |
| 6,219,690 | B1 | 4/2001 | Slingwine et al. |
| 6,662,184 | B1 | 12/2003 | Friedberg |
| 6,886,162 | B1 | 4/2005 | McKenney |
| 6,996,812 | B2 | 2/2006 | McKenney |
| 7,191,272 | B2 | 3/2007 | McKenney |
| 7,287,135 | B2 | 10/2007 | McKenney et al. |
| 7,349,926 | B2 | 3/2008 | McKenney et al. |
| 7,353,346 | B2 | 4/2008 | McKenney et al. |
| 7,395,263 | B2 | 7/2008 | McKenney |
| 7,395,383 | B2 | 7/2008 | McKenney |
| 7,426,511 | B2 | 9/2008 | McKenney |
| 7,454,581 | B2 | 11/2008 | McKenney et al. |
| 7,472,228 | B2 | 12/2008 | McKenney et al. |
| 7,653,791 | B2 | 1/2010 | McKenney |
| 7,668,851 | B2 | 2/2010 | Triplett |

(Continued)

OTHER PUBLICATIONS

P. Zijlstra, "[PATCH] slab: document SLAB_DESTROY_BY_RCU", LKML.org, Nov. 13, 2008, 1 page.

(Continued)

*Primary Examiner* — Jared Rutz
*Assistant Examiner* — William E Baughman
(74) *Attorney, Agent, or Firm* — Walter W. Duft

(57) ABSTRACT

A technique for enabling hardware transactional memory (HTM) to work more efficiently with readers that can tolerate stale data. In an embodiment, a pre-transaction load request is received from one of the readers, the pre-transaction load request signifying that the reader can tolerate pre-transaction data. A determination is made whether the pre-transaction load request comprises data that has been designated for update by a concurrent HTM transaction. If so, a cache line containing the data is marked as pre-transaction data. The concurrent HTM transaction proceeds without aborting notwithstanding the pre-transaction load request.

14 Claims, 3 Drawing Sheets

(56) References Cited

U.S. PATENT DOCUMENTS

| | | | |
|---|---|---|---|
| 7,689,789 B2 | 3/2010 | McKenney et al. | |
| 7,734,879 B2 | 6/2010 | McKenney et al. | |
| 7,734,881 B2 | 6/2010 | McKenney et al. | |
| 7,747,805 B2 | 6/2010 | McKenney | |
| 7,814,082 B2 | 10/2010 | McKenney | |
| 7,818,306 B2 | 10/2010 | McKenney et al. | |
| 7,873,612 B2 | 1/2011 | McKenney et al. | |
| 7,904,436 B2 | 3/2011 | McKenney | |
| 7,934,062 B2 | 4/2011 | McKenney et al. | |
| 7,953,708 B2 | 5/2011 | McKenney et al. | |
| 7,953,778 B2 | 5/2011 | McKenney et al. | |
| 7,987,166 B2 | 7/2011 | McKenney et al. | |
| 8,020,160 B2 | 9/2011 | McKenney | |
| 8,055,860 B2 | 11/2011 | McKenney et al. | |
| 8,055,918 B2 | 11/2011 | McKenney et al. | |
| 8,108,696 B2 | 1/2012 | Triplett | |
| 8,126,843 B2 | 2/2012 | McKenney et al. | |
| 8,140,497 B2 | 3/2012 | Goodman et al. | |
| 8,176,489 B2 | 5/2012 | Bauer et al. | |
| 8,185,704 B2 | 5/2012 | McKenney et al. | |
| 8,195,893 B2 | 6/2012 | Triplett | |
| 8,307,173 B2 | 11/2012 | McKenney | |
| 2005/0060559 A1* | 3/2005 | McKenney | 713/190 |
| 2005/0066095 A1* | 3/2005 | Mullick et al. | 710/200 |
| 2006/0112121 A1 | 5/2006 | McKenney et al. | |
| 2006/0219772 A1* | 10/2006 | Bernstein et al. | 235/379 |
| 2006/0265373 A1 | 11/2006 | McKenney et al. | |
| 2006/0282481 A1* | 12/2006 | Zhou et al. | 707/204 |
| 2008/0077591 A1* | 3/2008 | Gupta et al. | 707/8 |
| 2008/0082532 A1 | 4/2008 | McKenney | |
| 2008/0313238 A1 | 12/2008 | McKenney et al. | |
| 2009/0006403 A1 | 1/2009 | McKenney | |
| 2009/0077080 A1 | 3/2009 | McKenney | |
| 2009/0319753 A1* | 12/2009 | Welc et al. | 711/200 |
| 2009/0320030 A1 | 12/2009 | Ogasawara | |
| 2010/0218195 A1* | 8/2010 | Adl-Tabatabai et al. | 718/107 |
| 2011/0055630 A1 | 3/2011 | McKenney et al. | |
| 2011/0137962 A1 | 6/2011 | McKenney et al. | |
| 2011/0283082 A1 | 11/2011 | McKenney et al. | |
| 2012/0047140 A1 | 2/2012 | McKenney et al. | |
| 2012/0079301 A1 | 3/2012 | McKenney | |
| 2012/0144129 A1 | 6/2012 | McKenney | |
| 2012/0324170 A1 | 12/2012 | McKenney | |
| 2012/0324461 A1 | 12/2012 | McKenney | |
| 2012/0324473 A1 | 12/2012 | McKenney | |
| 2012/0331237 A1 | 12/2012 | McKenney | |
| 2012/0331238 A1 | 12/2012 | McKenney | |
| 2013/0061071 A1 | 3/2013 | McKenney | |

OTHER PUBLICATIONS

A. Arcangeli et al., "Using Read-Copy-Update Techniques for System V IPC in the Linux 2.5 Kernel," 2003 FREENIX, Jun. 14, 2003, 13 pages.
P. McKenney, "The RCU API, 2010 Edition", LWN.net, Dec. 8, 2010, 11 pages.
M. Desnoyers et al., "User-Level Implementations of Read-Copy Update", IEEE Transactions on Parallel and Distributed Systems, vol. x, No. y, Jul. 2009, pp. 1-14.
J. Triplett, "Scalable Concurrent Hash Tables via Relativistic Programming", ACM-SIGOPS Operating System Review vol. 44, Issue 3, Jul. 2010, 14 pages.
T. Gleixner, High Resolution Timers / Dynamic Tics—V2, LWN.net, Oct. 31, 2006, 5 pages.
D. Brodkowski, "Re: A few questions and issues with dynticks, NOHZ and powertop", Apr. 6, 2010, see <http://linux.derkeiler.com/Mailing-Lists/Kernel/2010-04/msg01380.html>, 4 pages.
Ip.com et al.; "Avoiding Unnecessary Wakeups When Waking Up CPUs At the Completion of a Grace Period", IPCOM000216206D, Mar. 25, 2012.
Ihornbeck et al . . . ; "Power Management in the Linux Kernel", Apr. 7, 2011, pp. 1-31.
McKenney, "Getting RCU Further Out of the Way", 2012 Linux Plumbers Conference, Real Time Microconference, Aug. 31, 2012, 31 pages.
M. Heinrich, "The Performance and Scalability of Distributed Shared Memory Cache Coherence Protocols", Ph.D. Dissertation, Chapter Two, Computer Systems Laboratory, Stanford University, Oct. 1998 <www.csl.cornell.edu/~heinrich/dissertation/ChapterTwo.pdf>, 27 pages.
J. Seigh, "RCU+SMR for preemptive kernel/user threads," Linux Kernel Mailing List, May 9, 2005, 2 pages.
M. Michael, "Hazard Pointers: Safe Memory Reclamation for Lock-Free Objects," IEEE Transactions on Parallel and Distributed Systems, Jun. 2004, vol. 15, No. 6, pp. 491-504.
D. Sarma et al., "Making RCU Safe for Deep Sub-Millisecond Response Realtime Applications," 2004 USENIX (UseLinux track) Jun. 2004, 9 pages.
P. McKenney, "RCU vs. Locking Performance on Different CPUs," 2004 Linux.conf.au, 2004, 18 pages.
P. McKenney et al., "Scaling dcache with RCU," Linux Journal, Jan. 1, 2004, 12 pages.
P. McKenney et al., "Using RCU in the Linux 2.5 Kernel," Linux Journal, Oct. 1, 2003, 11 pages.
P. McKenney et al.,"Read-Copy Update," 2002 Ottawa Linux Symposium, Jul. 8, 2002, 32 pages.
H. Lindar et al., "Scalability of the Directory Entry Cache," 2002 Ottawa Linux Symposium, Jun. 26, 2002, pp. 289-300.
P. McKenney et al., "Read-Copy Update," 2001 Ottawa Linux symposium, Jul. 2001, 22 pages.
P. McKenney et al., "Read-Copy Update: Using Execution History to Solve Concurrency Problems," PDCS, Oct. 1998, 11 pages.
S. Dietrich et al., "Evolution of Real-Time Linux," 7th RTL Workshop, Nov. 17, 2005, 18 pages.
B. Gamsa, "Tornado: Maximizing Locality and Concurrency in a Shared Memory Multiprocessor Operating System," 1999, 14 pages.
Molnar et al., "Realtime and Linux," 2005 Linux Kernel Summit, 8 pages.
H. Boehm, "The Space Cost of Lazy Reference Counting," ACM SIGPLAN Notices, Proceedings of the 31st ACM SIGPLAN—SIGACT Symposium on Principles of Programming Languages, POPL '04, vol. 39, Issue 1, Jan. 2004, p. 210-219.
M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.
D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.
J. Corbet, "Read-copy-update for realtime," LWN.net, Sep. 26, 2006, 3 pages.
McKenney, "Seven real-time Linux approaches (Part C)", LinuxDevices.com, Jun. 7, 2005, 13 pages.
P. McKenney, "RCU and CONFIG_PREEMPT_RT progress," Linux Kernel Mailing List, May 9, 2005, 2 pages.
O. Nesterov, QRCU: 'Quick' SRCU Implementation, Linux Kernel Mailing List, Dec. 1, 2005, 3 pages.
P. McKenney, "Sleepable RCU", LWN.net, Oct. 9, 2006, 10 pages.
P. McKenney, "Read-Copy Update Implementations", 2001, 3 pages.
M. Herlihy, "A Methodology for Implementing Highly Concurrent Data Objects," ACM Transactions on Programming Languages and Systems, vol. 15, Issue 5, Nov. 1993, pp. 745-770.
M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.
N. Barghouti et al., "Concurrency Control in Advanced Database Operations," Jan. 1994, 83 pages.
P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.

(56) References Cited

OTHER PUBLICATIONS

P. McKenney et al., "Extending RCU for Realtime and Embedded Workloads," 2006 Ottawa Linux Symposium, Aug. 11, 2006, 15 pages.
P. McKenney, "The design of preemptible read-copy-update," LWN.net, Oct. 8, 2007, 27 pages.
P. McKenney, "Integrating and Validating dynticks and Preemptible RCU," LWN.net, Apr. 22, 2008, 19 pages.
P. McKenney, "Hierarchical RCU," LWN.net, Nov. 4, 2008, 19 pages.
P. McKenney, "Is Parallel Programming Hard, and, If So, What Can You Do About It", Mar. 8, 2009, 146 pages.
P. McKenney, "Priority-Boosting RCU Read-Side Critical Sections," LWN.net, Feb. 5, 2007, 15 pages.
P. McKenney et al., "Towards hard realtime response from the Linux kernel on SMP hardware," linux.conf.au, Canberra, Australia, Apr. 2005, 16 pages.
P. McKenney et al., "Exploiting Deferred Destruction: An Analysis of Read-Copy-Update Techniques in Operating System Kernels", Jan. 3, 2005, pp. 1-41.
D. Guniguntala et al., "The read-copy-update mechanism for supporting real-time applications on shared-memory multiprocessor systems with Linux", IBM Systems Journal vol. 47 No. 2, 2008, pp. 221-236.
P. McKenney, "Introducing Technology Into Linux", 2008 Linux Developer Symposium, China, 2008, 47 pages.
P. McKenney, "Simplicity Through Optimization", linux.conf.au, Jan. 2010, 109 pages.
P. McKenney, "Deterministic Synchronization in Multicore Systems: the Role of RCU", Aug. 18, 2009, pp. 1-9.
P. McKenney, "RCU cleanups and simplified preemptable RCU", LKML.org, Jul. 23, 2009, 1 page.
P. McKenney, "Expedited "big hammer" RCU grace periods", LKML.org, Jun. 25, 2009, 2 pages.
P. McKenney, "RCU: The Bloatwatch Edition", LWN.net, Mar. 17, 2009, 9 pages.
M. Desnoyers, "Low-Impact Operating System Tracing", University of Montreal, PhD Thesis, Dec. 2009, 233 pages.
P. McKenney, "Using a Malicious User-Level RCU to Torture RCU-Based Algorithms", linux.conf.au, Jan. 2009, 51 pages.
P. McKenney et al., "Introducing Technology Into the Linux Kernel: A Case Study", Operating Systems Review, Jul. 2008, 16 pages.
P. McKenney, "What is RCU, Fundamentally", LWN.net, Dec. 17, 2007, 15 pages.
P. McKenney, What is RCU? Part 2: Usage, LWN.net, Dec. 24, 2007, 15 pages.
P. McKenney, RCU part 3: the RCU API, LWN.net, Jan. 7, 2008, 7 pages.
T. Hart et al., "Performance of memory reclamation for lockless synchronization", Journal of Parallel and Distributed Computing, Dec. 2007, pp. 1270-1285.
McKenney, "Using Promela and Spin to verify parallel algorithms", LWN.net, Aug. 1, 2007, 11 pages.
McKenney, "RCU and Unloadable Modules", LWN.net, Jan. 14, 2007, 4 pages.

* cited by examiner

ENABLING HARDWARE TRANSACTIONAL MEMORY TO WORK MORE EFFICIENTLY WITH READERS THAT CAN TOLERATE STALE DATA

BACKGROUND

1. Field

The present disclosure relates to computer systems and methods in which data resources are shared among data consumers while preserving data integrity and consistency relative to each consumer. More particularly, the invention concerns the use of hardware transactional memory in conjunction with certain types of readers that can tolerate stale data, such as readers whose memory loads are protected by read-copy update or hazard pointers.

2. Description of the Prior Art

By way of background, hardware transactional memory (HTM), read-copy update (RCU), and hazard pointers all provide techniques for concurrent programming, each with various advantages and disadvantages. Although HTM data updates can be performed in conjunction with RCU and hazard pointer data read operations, current HTM implementations result in RCU/hazard-pointer readers needlessly aborting concurrent conflicting updates. Applicant submits that a more efficient approach would be for the RCU/hazard-pointer reader loads to return pre-transactional data, so as to allow the updaters to make forward progress despite concurrent conflicting readers. However, this approach is problematic due to current hardware cache-coherence schemes. HTM relies on invalidating other CPU's copies of variables that it updates, and handing out copies of old values of those variables would defeat HTM. For example, another transaction on one of the other CPUs might incorrectly use the old value of one of the variables, thereby defeating inter-transaction atomicity. There is thus a need for an improved technique that permits HTM to operate correctly, and also to interoperate efficiently with concurrent conflicting readers that rely on RCU, hazard-pointer readers, or possibly other lockless synchronization techniques.

SUMMARY

A method, system and computer program product are provided for enabling hardware transactional memory (HTM) to work more efficiently with readers that can tolerate stale data. In an embodiment, a pre-transaction load request is received from one of the readers, the pre-transaction load request signifying that the reader can tolerate pre-transaction data. A determination is made whether the pre-transaction load request comprises data that has been designated for update by a concurrent HTM transaction. If so, a cache line containing the data is marked as pre-transaction data. The concurrent HTM transaction proceeds without aborting notwithstanding the pre-transaction load request. Normal loads will ignore such cache lines, resulting in a cache miss for readers that cannot tolerate pre-transaction data.

In an embodiment, the data is returned without marking the cache line if the data has not been designated for update by a concurrent HTM transaction.

In an embodiment, the data is copied from a transferror cache associated with the concurrent HTM transaction to a transferee cache associated with the reader, and marking the cache line comprises marking a cache line containing the data in both the transferror cache and the transferee cache. The transferee cache may be on a first computer system, representing a local node, and the transferror cache may be on a second computer system, representing a remote node, the local and remote nodes being in communication with each other via a node interconnect. In that case, pre-transaction request and response messages may be exchanged between the local and remote nodes as part of copying the data from the transferror cache to the transferee cache.

In an embodiment, the pre-transaction load request comprises a pre-transaction load instruction that is either explicitly specified by a reader or emitted by a compiler during source code compilation of a non-transaction-specific load instruction.

In an embodiment, marking the cache line is performed following a wait period in which the concurrent HTM transaction fails to complete.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 4:
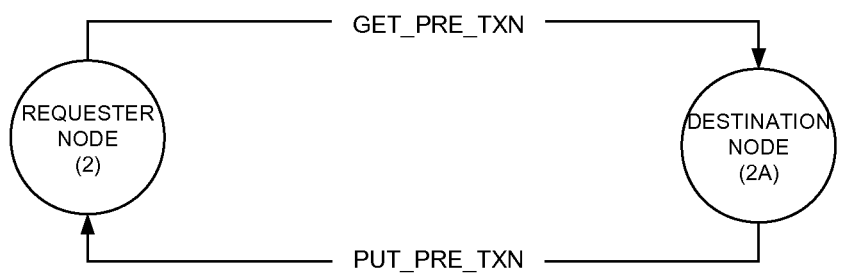
FIG. 4 is a functional block diagram showing two instances of the computer system of FIG. 1 exchanging cache coherence messages.

Turning now to the figures, wherein like reference numerals represent like elements in all of the several views, FIG. 4 illustrates an example multiprocessor computer system 2 that may be used to implement the technique disclosed herein. A uniprocessor computer system could also be used. The computer system 2 includes multiple processors $4_1$, $4_2$ ... $4_n$, a system bus 6, and a program memory 8. There are also cache memories $10_1$, $10_2$ ... $10_n$ and cache controllers $12_1$, $12_2$ ... $12_n$ respectively associated with the processors $4_1$, $4_2$ ... $4_n$. A memory/node controller 14 is associated with the memory 8. As shown, the memory/node controller 14 may reside separately from processors $4_2$ ... $4_n$ (e.g., as part of a chipset). Alternatively, the memory/node controller 14 could be provided by plural memory controller instances respectively integrated with the processors $4_2$ ... $4_n$ (as is known in the art). As discussed in more detail below, the memory/node controller 14 includes both memory controller logic for supporting local access to the shared memory 8 by any of the processors $4_2$ ... $4_n$, but also node controller logic for handling memory access requests to and from remote nodes representing other instances of the computer system 2.

The computer system 2 may represent any of several different types of computing apparatus. Such apparatus may include, but are not limited to, general purpose computers, special purpose computers, portable computing devices, communication and/or media player devices, set-top devices, embedded systems, to name but a few. The processors $4_1$, $4_2$ ... $4_n$ may each be a single-core CPU device. Alternatively, the processors $4_1$, $4_2$ ... $4_n$ could represent individual cores within a multi-core CPU device. Each CPU device embodied by any given processor 4 is operable to execute program instruction logic under the control of a software program stored in the memory 8 (or elsewhere). The memory 8 may comprise any type of tangible storage medium capable of storing data in computer readable form, including but not limited to, any of various types of random access memory (RAM), various flavors of programmable read-only memory (PROM) (such as flash memory), and other types of primary storage. The processors $4_1, 4_2 \ldots 4_n$ may be situated within a single computing device or node (e.g., as part of a single-node SMP system) or they may be distributed over plural nodes (e.g., as part of a NUMA system, a cluster, a cloud, etc.).

Figure 1:
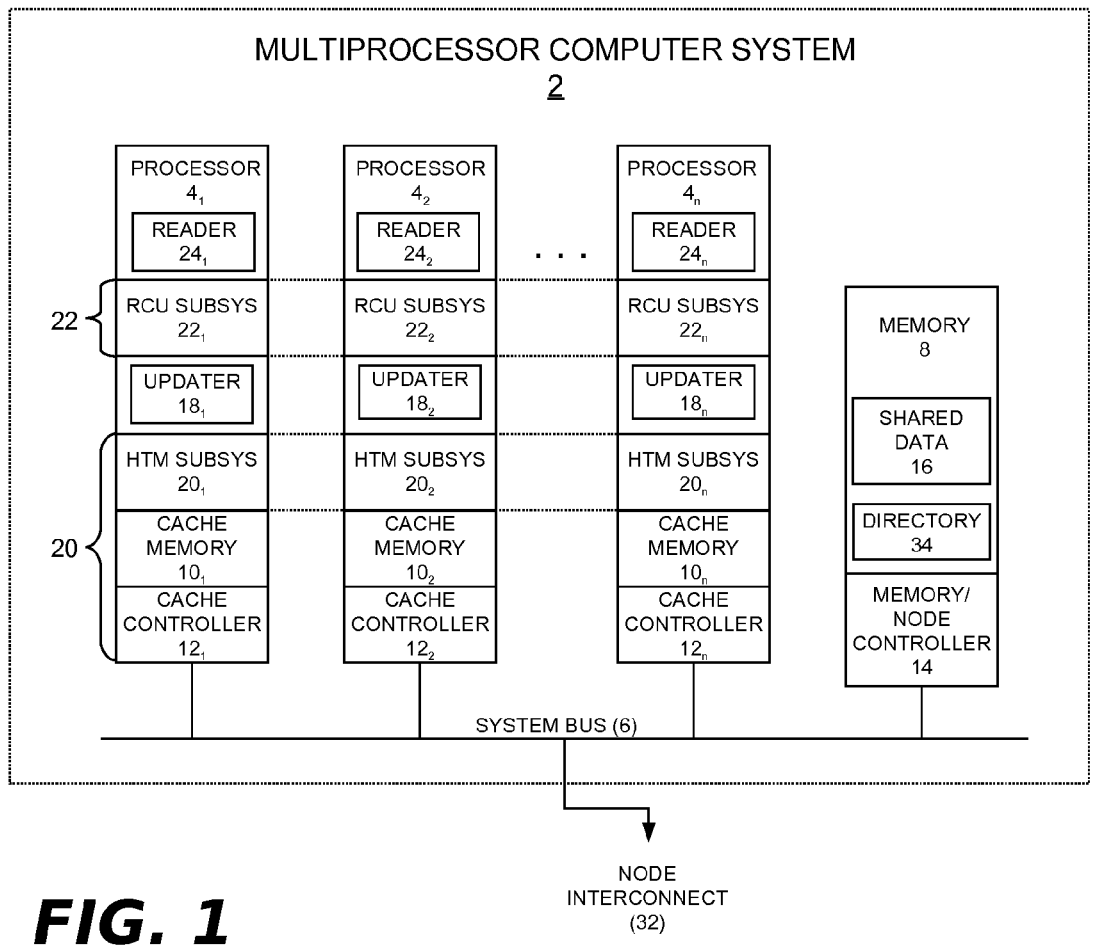
FIG. 1 is a functional block diagram showing an example computer system that implements data readers, data updaters, a TM subsystem, and an RCU subsystem.

Update operations (updaters) 18 may periodically execute within a process, thread, or other execution context (hereinafter "task") on any processor 4. In FIG. 1, reference numerals $18_1, 18_2 \ldots 18_n$ illustrate individual updaters that may respectively execute on the several processors $4_1, 4_2 \ldots 4_n$. Each updater 18 runs from program instructions stored in the memory 8 (or elsewhere) in order to periodically perform updates on a set of shared data 16 that may be stored in the shared memory 8 (or elsewhere). The updates performed by the updaters 18 may include modifying elements of a linked list, inserting new elements into the list, deleting elements from the list, and many other types of operations (involving lists or other data structures).

The updaters 18 may perform their updates to the shared data 16 using a Hardware Transactional Memory (HTM) subsystem 20 that operates in the computer system 2. In FIG. 1, reference numerals $20_1, 20_2 \ldots 20_n$ illustrate individual HTM subsystem instances that may respectively execute on the several processors $4_1, 4_2 \ldots 4_n$. The HTM subsystem 20 is shown as including the cache memories 10 and the cache controllers 12, because portions of the cache memory 10 may be dedicated to transaction usage, and because the cache controllers 12 may implement logic that supports storing and maintaining a transaction's read and write sets. The HTM subsystem 20 may further include software logic stored in the memory 8 (e.g., to facilitate API interaction), and may also include HTM instruction support in the processors $4_1, 4_2 \ldots 4_n$.

The HTM subsystem 20 implements updates to the shared data 16 as serialized transactions that tend to be atomic, consistent, isolated, and to some extent durable. Each transaction either completes successfully without conflict with other transactions, in which case the transaction is committed, or it does not complete, in which case the transaction is aborted and rolled back. Roll back is performing by reverting the transaction state changes and reclaiming the memory locations used to hold uncommitted data written during the transaction.

The HTM subsystem 20 implements load and store instructions that operate on a transaction's read and write sets. As persons skilled in the art will appreciate, a transaction's read set and write set respectively represent the shared memory values that have been read and written during a transaction. The HTM subsystem 20 also manages transaction state as a transaction proceeds to the point where it either commits or fails. A transaction will typically commit only if no other transaction has updated any location in the transaction's read or write set, and no other transaction has read any location in the transaction's write set. To make this determination, the HTM subsystem 20 may implement any suitable form of conflict detection. When a transaction commits, the transaction's changes to its write set become finalized. If the commit fails, the transaction aborts. A transaction abort causes all changes to the transaction's write set (i.e., the uncommitted transaction data) to be discarded. This is known as a roll back.

Some or all of the updaters 18 may also perform updates to the shared data using a Read-Copy Update (RCU) subsystem 22. The RCU subsystem 22 comprises RCU subsystem instances $22_1, 22_2 \ldots 22_n$ that may respectively execute on the processors 4 from program instructions stored in the memory 8. As is known, RCU is a synchronization technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The read-copy update technique implements data updates in two phases. In the first (initial update) phase, the actual data update is carried out in a manner that temporarily preserves two views of the data being updated. One view is the old (pre-update) data state that is maintained for the benefit of operations that may be currently referencing the data. The other view is the new (post-update) data state that is available for the benefit of operations that access the data following the update. In the second (deferred update) phase, the old data state is removed following a "grace period" that is long enough to ensure that all executing operations will no longer maintain references to the pre-update data. In the context of the read-copy update mechanism, a grace period represents the point at which all running tasks (e.g., processes, threads, or other execution contexts) having access to an RCU-protected data element have passed through a "quiescent state" after which they can no longer maintain references to the data element, assert locks thereon, or make any assumptions about data element state. By convention, for operating system kernel code paths, a context switch, an idle loop, and user mode execution all represent quiescent states for any given CPU (as can other operations that will not be listed here). The second-phase update operation typically comprises freeing a stale data element from memory.

Read operations (readers) 24 may periodically execute within a process, thread, or other execution context (hereinafter "task") on any processor 4. In FIG. 1, reference numerals $24_1, 24_2 \ldots 24_n$ illustrate individual readers that may respectively execute on the several processors $4_1, 4_2 \ldots 4_n$. Each reader 24 runs from program instructions stored in the memory 8 (or elsewhere) in order to periodically perform read operations on the set of shared data 16 that may be stored in the shared memory 8 (or elsewhere). The readers 14 may access the shared data 16 using one or more lockless synchronization techniques which operate under the assumption that the readers can tolerate stale data. One approach would be to use the RCU subsystem 22, which conventionally includes various read-side primitives for ensuring that reader memory accesses are protected against concurrent data updates. For example, the rcu_dereference( ) primitive may be used by readers traversing linked lists. Another approach would be to have the readers 24 set/clear hazard pointers when engaging in their memory accesses. The updaters 18 would then be required to check for the presence of such hazard pointers when performing data updates.

A further feature of the computer system 2 of FIG. 1 is that it may represent a computing node in a distributed computing environment, such as a NUMA (Non-Uniform Memory Access) system. In that case, the processors 4 will not only load and store data in the shared memory 8 shown in FIG. 1, but will also access shared memory located on other nodes that may be implemented as additional instances of the computer system 2. Remote memory accesses to such other nodes will take place over a suitable node interconnect 32. A cache coherence protocol may be utilized in which a directory 34 stored in the shared memory 8 is used to identify remote nodes that are caching data stored locally in the shared memory. The directory 34 may be managed by node controller logic associated with the memory/node controller 14. This node controller logic also manages memory accesses by the local processors 4 to the shared memory located on the remote nodes. As is conventional, this functionality may include the exchange of request/response messages with counterpart node controller logic on the other nodes. As described in more detail below, the node controller logic may also implement new functionality associated with the HTM subsystem 20.

When an updater 18 uses the HTM subsystem 20 to carry out an update, and modifies a cache line, a pre-transaction version of the modified data is conventionally retained in one or more cache lines as part of the transaction's write set so that the transaction can be rolled back if needed. This pre-transaction cache line data is discarded once the transaction either aborts (in which case its value is retained) or commits (in which case its value is discarded). As briefly discussed in the Background section above, although HTM data updates can be performed in conjunction with RCU and hazard pointer data read operations, current HTM implementations result in such read operations aborting concurrent conflicting updates if they seek to load data marked for update by an in-flight transaction. However, a premise underlying the use of RCU or hazard pointers is that readers can tolerate stale data, and so do not need to wait for an update to complete before performing a memory load operation.

One potential approach would be for the RCU/hazard-pointer reader loads to return pre-transactional data, so as to allow the updaters to make forward progress despite concurrent conflicting readers. However, implementing this approach is problematic due to current hardware cache-coherence schemes. HTM relies on invalidating other CPU's copies of variables that it updates, and handing out copies of old values of those variables would defeat HTM. For example, another transaction on one of the other CPUs might incorrectly use the old value of one of the variables, thereby defeating inter-transaction atomicity. There is thus a need for an improved technique that permits HTM to operate correctly, and also to interoperate efficiently with concurrent conflicting RCU and hazard-pointer readers.

Figure 2:
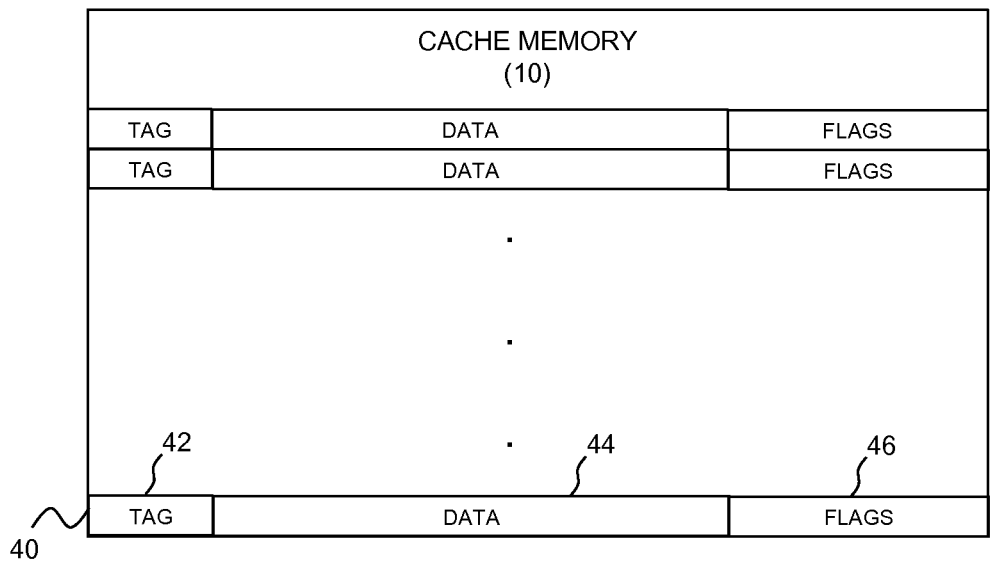
FIG. 2. is a diagrammatic representation of a cache memory shown in FIG. 1.
Figure 3:
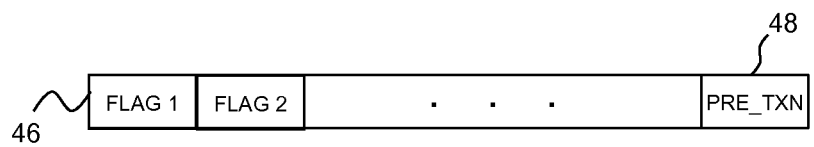
FIG. 3 is a diagrammatic representation of an example cache line of the cache memory of FIG. 2.

The present disclosure envisions an approach wherein cache lines fetched by readers that can tolerate stale pre-transaction data are marked so that these readers can make use of the data, and so that transactions will not abort in response to attempted loads by such readers. Turning now to FIG. 2, a typical cache line 40 in the cache memories 10 will include a tag field 42, a data field 44 and a field 46 containing various status flags, such as INVALID, VALID, DIRTY, RESERVED, etc. In FIG. 3, the flag field 46 of a cache line 40 is shown as including a new flag contemplated by the present disclosure, labeled "PRE_TXN." This flag is set by the HTM subsystem 22 (e.g., using logic in the cache-controllers 12) in response to a special pre-transactional load instruction or instruction variant issued by a reader 24 that can tolerate pre-transaction data. The pre-transactional load instruction/variant could either be explicitly specified by a reader 24, or could be emitted by a compiler during source code compilation in response to an existing non-transaction-specific load instruction, such as the RCU rcu_deference( ) primitive. For example, a C++ 11 compiler that fully implements memory_order_consume loads (e.g., to order pointer loads before pointer dereferences) could use the special instructions/variants for the memory_order_consume loads themselves and also for any loads depending on a memory_order_consume load. Note that a C++ 11 compiler is required to track these dependencies.

Relatedly, as shown in FIG. 4, the node controller logic in the memory/node controller 14 of FIG. 1 can be supplemented with new HTM subsystem logic so that interconnect messages sent between nodes over the interconnect 32 (see FIG. 1) identify memory load requests and responses that are intended only for use by readers 24 that can tolerate pre-transaction data. If such a reader 24 on the computer system 2 uses a pre-transactional load instruction/variant directed to data stored on a counterpart system 2A, the first computer system, acting as a requester node, could send a request message, which may be called GET_PRE_TXN, to the second computer system, acting as a destination node, where the data is stored. The destination node could then return the requested data in a response message, which may be called PUT_PRE_TXN.

If the pre-transactional load instruction/variant misses in a loading processor's cache memory 10, and also finds that the target cache line has been modified by an ongoing transaction executing on a processor 4 that has the line cached, the pre-transaction value of the cache line is returned, and is also marked with the PRE_TXN flag bit in that processor's cache memory 10 (i.e., the transferror cache). The cache line, along with the PRE_TXN bit, is loaded into the loading processor's cache memory 10 (i.e., the transferee cache). Normal loads will ignore any cache line with the PRE_TXN bit set, resulting in a cache miss, but the pre-transaction instruction/variant will load values from it. This means that potentially stale values are ignored by any code not requesting pre-transaction values.

The HTM subsystem 22 is further modified so that update transactions will not abort due an attempt by a reader 24 to read a cache line in a transaction's write set using the above-described pre-transactional load instruction/variant. As stated, the cache line will be marked with the PRE_TXN flag and the cache line will be returned. On the other hand, an attempt to read the same cache line as part of a normal load will likely abort the transaction if it is in progress when the normal load request is made, and as mentioned above, will also produce a cache miss.

Figure 5:
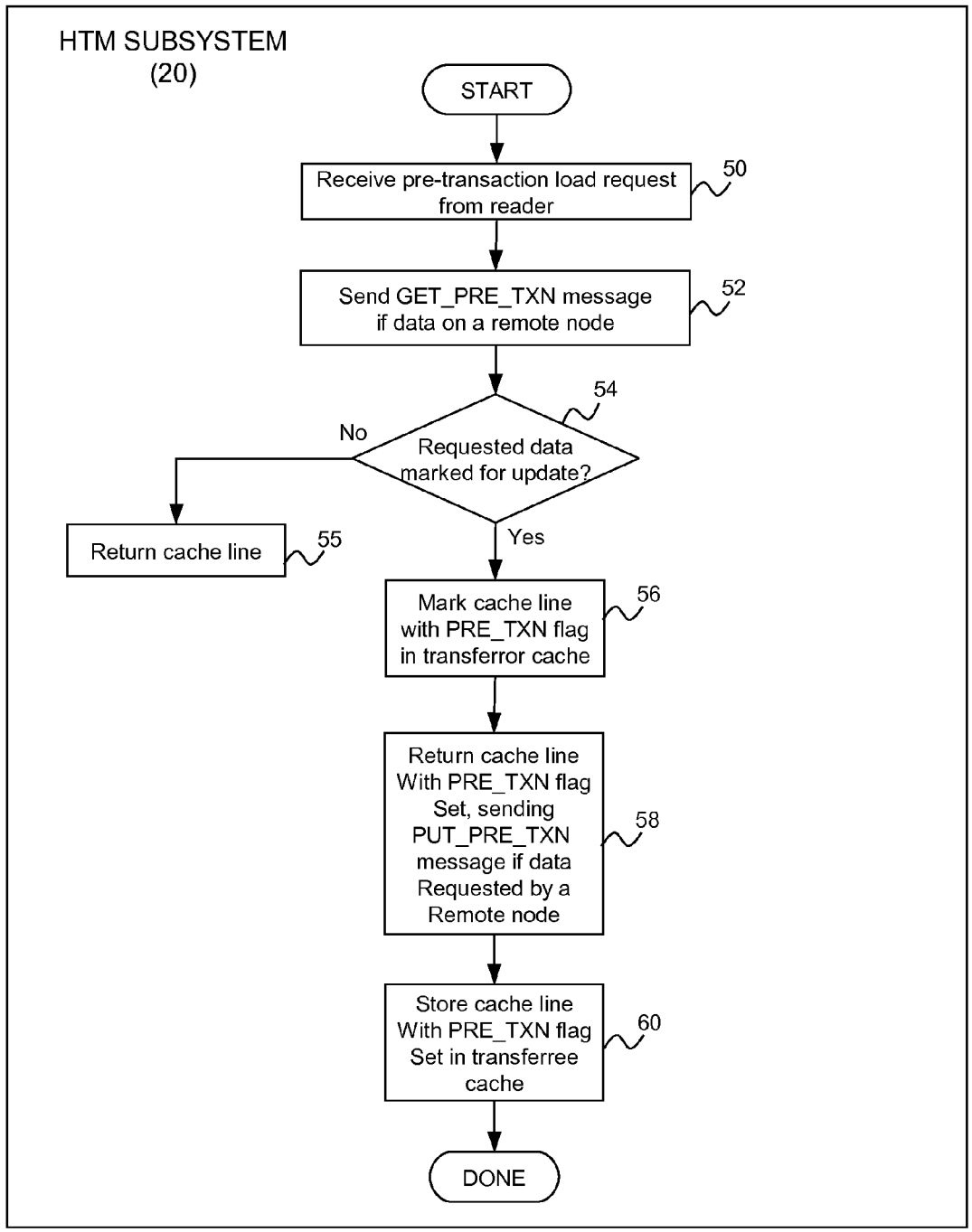
FIG. 5 is a flow diagram showing operation of an example operations of the computer system of FIG. 1.

FIG. 5 illustrates the foregoing operations. In block 50, the HTM subsystem 20 receives a pre-transaction load request from a reader 24 that can tolerate stale data. In block 52, the HTM subsystem 20 sends a GET_PRE_TXN message over the node interconnect 32 if the requested data is stored at a remote node. In block 54, the HTM subsystem 20 determines whether the requested data has been marked for update by a concurrent update transaction. If not, the requested cache line is returned in normal fashion in block 55. If block 54 does determine that the requested data forms part of a transaction's write set, the corresponding cache line in the transferror cache is marked with the PRE_TXN flag in block 56. In block 58, the requested cache line, with the PRE_TXN flag set, is returned to the requesting processor. If the transferror cache memory 10 is on a remote node, the cache line is returned using a PUT_PRE_TXN message via the node interconnect 32. In block 60, the cache line with the PRE_TXN flag set is stored in the transferee cache.

As a further modification, the HTM subsystem 20 could defer implementing the processing of blocks 56-60 for a specified period of time in order to wait until the transaction either commits or aborts. If the transaction completes within the wait period, block 55 could be implemented to return the requested data as if no transaction had been detected in block 54. Blocks 56-60 would only be implemented if the transaction did not complete within the specified time period. The HTM subsystem 20 might statically chose whether to implement the foregoing delay period prior to run time, or it might chose to do so dynamically at run time. The decision could be based on analysis of in-flight transactions, statistics about the run time of past instances of the same transaction, or based on an adaptive strategy limited by response time. For example, the HTM subsystem 20 could wait for up to a fixed time (say 10 nanoseconds) for the transaction to commit, and if it doesn't commit, send back pre-transactional data with a PRE_TXN flag marking Otherwise, if the transaction commits within that time, the HTM subsystem 20 might respond as if to a normal load request. This timeout could also be varied based on estimates of the likelihood of a normal read needing access to the same cache line (which would result in an additional cache miss if pre-transaction data was used in the response).

Accordingly, a technique for enabling hardware transactional memory to work more efficiently with readers that can tolerate stale data has been disclosed. It will be appreciated that the foregoing concepts may be variously embodied in any of a data processing system, a machine implemented method, and a computer program product in which programming logic is provided by one or more machine-useable storage media for use in controlling a data processing system to perform the required functions. Example embodiments of a data processing system and machine implemented method were previously described in connection with FIGS. 1-5. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Example data storage media for storing such program instructions are shown by reference numerals 8 (memory) and 10 (cache) of the computer system 2 of FIG. 1. The system 2 may further include one or more secondary (or tertiary) storage devices (not shown) that could store the program instructions between system reboots. A further example of media that may be used to store the program instructions would be portable optical storage disks of the type that are conventionally used for commercial software sales, such as compact disk-read only memory (CD-ROM) disks, compact disk-read/write (CD-R/W) disks, and digital versatile disks (DVDs). Such media can store the program instructions either alone or in conjunction with an operating system or other software product that incorporates the required functionality. The data storage media could also be provided by portable magnetic storage media (such as floppy disks, flash memory sticks, etc.), or magnetic storage media combined with drive systems (e.g. disk drives). As is the case with the memory 8 and the cache 10 of FIG. 1, the storage media may be incorporated in data processing platforms that have integrated random access memory (RAM), read-only memory (ROM) or other semiconductor or solid state memory. More broadly, the storage media could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A system, comprising:
one or more processors;
a memory coupled to said one or more processors;
control logic implementing a hardware transactional memory (HTM) subsystem using said memory, said control logic being operable to perform operations that prevent a concurrent HTM transaction from aborting due to a concurrent reader, said operations comprising:
receiving a load request from said concurrent reader;
determining whether said load request signifies that said concurrent reader can tolerate pre-transaction data;
determining whether said load request comprises data that has been designated for update by said concurrent HTM transaction;
marking a cache line containing said data as pre-transaction data and returning said data to said concurrent reader if said load request signifies that said concurrent reader can tolerate pre-transaction data and comprises data that has been designated for update by said concurrent HTM transaction; and
if said load request comprises data that has been designated for update by said concurrent HTM transaction, aborting said concurrent HTM transaction in response to said load request if said cache line is not marked as containing pre-transaction data, and proceeding with said concurrent HTM transaction notwithstanding said load request if said cache line is marked as containing pre-transaction data.

2. A system in accordance with claim 1, wherein said operations further include returning said data without marking said cache line if said data has not been designated for update by said concurrent HTM transaction.

3. A system in accordance with claim 1, wherein said data is copied from a transferror cache associated with said concurrent HTM transaction to a transferee cache associated with said concurrent reader, and wherein said marking a cache line comprises marking a cache line containing said data in both said transferror cache and said transferee cache.

4. A system in accordance with claim 3, wherein said transferee cache is on said computer system, representing a local node, and said transferror cache is on a remote computer system, representing a remote node, said local and remote nodes being in communication with each other via a node interconnect.

5. A system in accordance with claim 4, wherein said method further includes exchanging request and response messages between said local and remote nodes as part of copying said data from said transferror cache to said transferee cache, said request and response messages signifying that said concurrent reader can tolerate pre-transaction data.

6. A system in accordance with claim 1, wherein said load request signifying that said concurrent reader can tolerate pre-transaction data comprises a pre-transaction load instruction that is either explicitly specified by said concurrent reader or emitted by a compiler during source code compilation of a non-transaction-specific load instruction.

7. A system in accordance with claim 1, wherein said marking a cache line is performed following a wait period in which said concurrent HTM transaction fails to complete.

8. A computer program product, comprising:
one or more machine-useable storage media;
control logic provided by said one or more media to implement a hardware transactional memory (HTM) subsystem, said control logic being operable to perform operations that prevent a concurrent HTM transaction from aborting due to a concurrent reader, said operations comprising:
receiving a load request from said concurrent reader;
determining whether said load request signifies that said concurrent reader can tolerate pre-transaction data;
determining whether said pre-transaction load request comprises data that has been designated for update by said concurrent HTM transaction;
marking a cache line containing said data as pre-transaction data and returning said data to said concurrent reader if said load request signifies that said concurrent reader can tolerate pre-transaction data and comprises data that has been designated for update by said concurrent HTM transaction; and
if said load request comprises data that has been designated for update by said concurrent HTM transaction, aborting said concurrent HTM transaction in response to said load request if said cache line is not marked as containing pre-transaction data, and proceeding with said concurrent HTM transaction notwithstanding said load request if said cache line is marked as containing pre-transaction data.

9. A computer program product in accordance with claim 8, wherein said operations further include returning said data without marking said cache line if said data has not been designated for update by said concurrent HTM transaction.

10. A computer program product in accordance with claim 8, wherein said data is copied from a transferror cache associated with said concurrent HTM transaction to a transferee cache associated with said concurrent reader, and wherein said marking a cache line comprises marking a cache line containing said data in both said transferror cache and said transferee cache.

11. A computer program product in accordance with claim 10, wherein said transferee cache is on a first computer system, representing a local node, and said transferror cache is on a second computer system, representing a remote node, said local and remote nodes being in communication with each other via a node interconnect.

12. A computer program product in accordance with claim 11, wherein said method further includes exchanging request and response messages between said local and remote nodes as part of copying said data from said transferror cache to said transferee cache, said request and response messages signifying that said concurrent reader can tolerate pre-transaction data.

13. A computer program product in accordance with claim 8, wherein said load request signifying that said concurrent reader can tolerate pre-transaction data comprises a pre-transaction load instruction that is either explicitly specified by said concurrent reader or emitted by a compiler during source code compilation of a non-transaction-specific load instruction.

14. A computer program product in accordance with claim 8, wherein said marking a cache line is performed following a wait period in which said concurrent HTM transaction fails to complete.

* * * * *